(12) United States Patent
Ehrlicher

(10) Patent No.: US 6,957,805 B2
(45) Date of Patent: Oct. 25, 2005

(54) GAS CHARGING UNIT OF A POLYURETHANE INJECTION MOLDING ASSEMBLY

(75) Inventor: Stefan Ehrlicher, München (DE)

(73) Assignee: Krauss-Maffei Kunststofftechnik GmbH, München (DE)

( * ) Notice: Subject to any disclaimer, the term of this patent is extended or adjusted under 35 U.S.C. 154(b) by 0 days.

(21) Appl. No.: 10/846,328

(22) Filed: May 14, 2004

(65) Prior Publication Data

US 2004/0207101 A1 Oct. 21, 2004

Related U.S. Application Data

(63) Continuation of application No. PCT/EP02/12654, filed on Nov. 13, 2002.

(30) Foreign Application Priority Data

Nov. 24, 2001 (DE) .......................................... 101 57 726

(51) Int. Cl.$^7$ .................................................. B01F 3/04
(52) U.S. Cl. ................... 261/81; 261/82; 261/DIG. 26; 366/337
(58) Field of Search ............................ 261/27, 28, 77, 261/79.2, 81, 82, DIG. 26; 366/3, 10, 337, 341

(56) References Cited

U.S. PATENT DOCUMENTS

| 2,948,928 | A | | 8/1960 | Ebneth et al. |
| 3,111,389 | A | * | 11/1963 | Hansen et al. ............... 422/133 |
| 3,232,709 | A | | 2/1966 | Cole, III |
| 3,434,805 | A | * | 3/1969 | Bar ............................ 422/133 |
| 3,604,509 | A | * | 9/1971 | Sachnik ....................... 169/15 |
| 3,773,300 | A | | 11/1973 | Hauser |
| 4,302,550 | A | * | 11/1981 | Pisaric et al. ............... 521/133 |
| 4,452,917 | A | * | 6/1984 | Proksa et al. ................. 521/50 |
| 4,652,138 | A | | 3/1987 | Inone et al. |
| 4,783,319 | A | * | 11/1988 | Habrich et al. ............. 422/135 |
| 5,255,747 | A | * | 10/1993 | Teske et al. .................. 169/15 |
| 5,984,280 | A | * | 11/1999 | Okuda et al. ................. 261/28 |
| 6,538,040 | B1 | * | 3/2003 | Okuda et al. ................. 516/10 |
| 6,602,916 | B2 | * | 8/2003 | Grundmann et al. .......... 516/10 |

FOREIGN PATENT DOCUMENTS

| DE | 36 24 909 C2 | 1/1987 |
| DE | 44 20 168 C1 | 2/1996 |
| DE | 44 46 876 A1 | 7/1996 |
| EP | 0 705 641 A | 4/1996 |

* cited by examiner

*Primary Examiner*—Scott Bushey
(74) *Attorney, Agent, or Firm*—Henry M. Feiereisen

(57) ABSTRACT

A gas charging unit for adding gas to a liquid polyurethane component, in particular a filler-laden polyurethane component of a polyurethane injection molding unit, includes a mixing vessel having an inlet opening and receiving a liquid polyurethane component via the inlet opening. Arranged in the mixing vessel in alignment with the inlet opening and axially adjustable in relation to the inlet opening is at least one movable mixing element to mix the polyurethane component fed into the mixing vessel with gas injected into the polyurethane component via a nozzle.

10 Claims, 2 Drawing Sheets

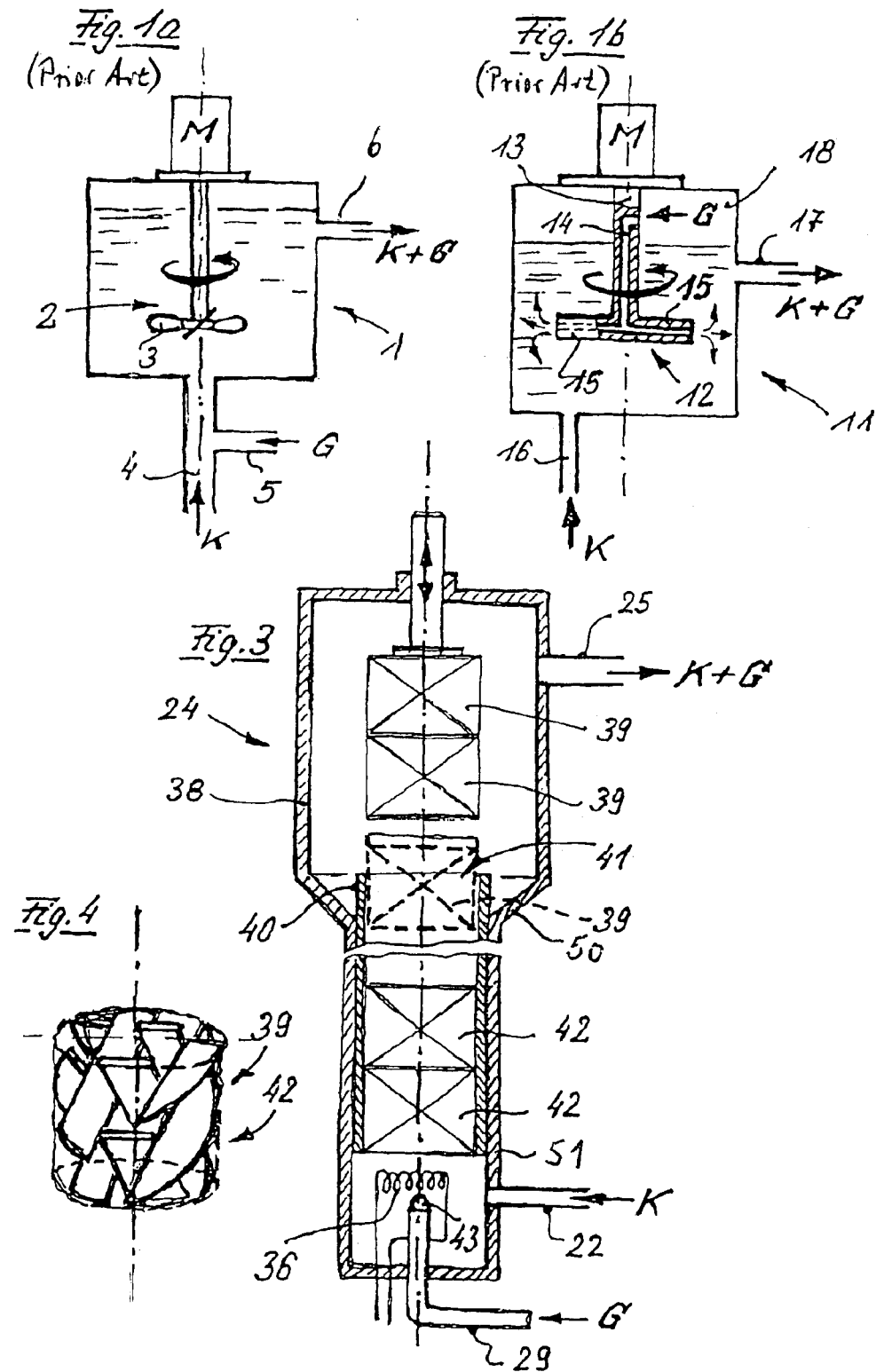

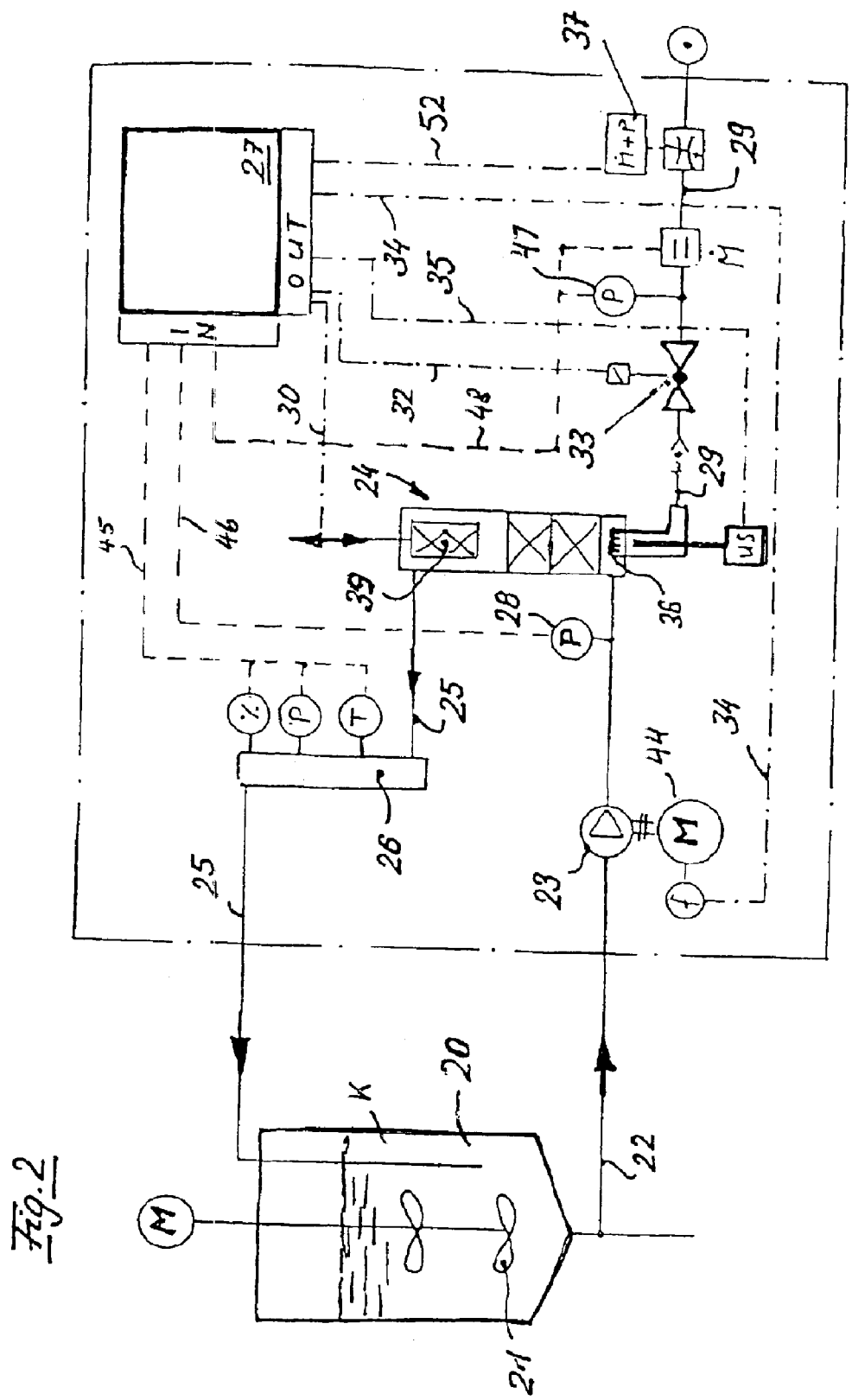

GAS CHARGING UNIT OF A POLYURETHANE INJECTION MOLDING ASSEMBLY

CROSS-REFERENCES TO RELATED APPLICATIONS

This application is a continuation of prior filed copending PCT International application no. PCT/EP02/12654, filed Nov. 13, 2002, which designated the United States and on which priority is claimed under 35 U.S.C. §120, the disclosure of which is hereby incorporated by reference.

This application claims the priority of German Patent Application, Serial No. 101 57 726.5, filed Nov. 24, 2001, pursuant to 35 U.S.C. 119(a)–(d), the disclosure of which is incorporated herein by reference.

BACKGROUND OF THE INVENTION

The present invention relates, in general, to an apparatus for adding gas to a liquid polyurethane component, such as a filler-laden polyurethane component, of a polyurethane injection molding assembly.

A conventional gas charging unit of a type is shown in FIG. 1a and includes a mixing vessel 1 and an agitator 2 which is provided at one end with blades 3 and operatively connected to a motor M for rotation in the mixing vessel 1. A feed conduit 4 is connected to the mixing vessel 1 for supply of a component K, such as e.g. polyol or isocyanate with fillers. A further feed conduit 5 connects into the feed conduit 4 for introducing gas G into the liquid component. The gas laden component K+G is discharged through an outlet line 6 at an upper location of the mixing vessel 1.

FIG. 1b shows another conventional mixing vessel 11 which accommodates an agitator 12 driven by a motor M. The agitator 12 includes a hollow shaft 13 and blades 15 which have gas channels 14 in fluid communication with the interior of the hollow shaft 13. A feed conduit 16 is connected to the mixing vessel 16 for introduction of a component K, and an outlet line 17 which branches off the mixing vessel 13 for discharge of the component K laden with gas G. Gas G is drawn from a gas chamber 18 above the liquid level of the component K via the hollow shaft 13 of the rotating agitator 12 and introduced into the component K via the gas channels 14 in the blades 15.

Gas charging units of these types suffer many shortcomings. For one, the mixing energy of the agitators 2, 12 is insufficient to maximize a gas introduction. Moreover, in view of their high speed rotation, the agitators 2, 12 crush the fillers (reinforcement fibers), and an effective sealing is difficult to implement. In addition, the dynamic agitators 2, 12 also heat up the polyurethane component K (polyol or isocyanate) to an unwanted degree. Further, the bubble size of admixed gas is not small enough and not sufficiently homogenous, and flow patterns may be established that cannot be influenced by the agitators 2, 12 and thus represent areas of insignificant mixing action.

As in the start-up of conventional polyurethane injection molding assemblies with static mixer and fixed mixing elements, introduced polyurethane component has not reached the required operating temperature, operation of the polyurethane injection molding assembly becomes impossible in this cold state with such mixers because the intrinsically viscous polyurethane component (isocyanate or polyol) is highly viscous and thus, the assembly would exceed the maximally admissible operating pressure.

It would therefore be desirable and advantageous to provide an improved gas charging unit for filler-laden polyurethane components, to obviate prior art shortcomings and to realize a gas introduction at maximum physically possible gas fraction, while still being gentle to filler constituents.

SUMMARY OF THE INVENTION

According to one aspect of the present invention, an apparatus for adding gas to a liquid polyurethane component, in particular a filler-laden polyurethane component of a polyurethane injection molding unit, includes a mixing vessel having an inlet opening and receiving a liquid polyurethane component via the inlet opening, at least one movable mixing element arranged in the mixing vessel in alignment with the inlet opening and axially displaceable in relation to the inlet opening, and a nozzle for introduction of gas into the mixing vessel via the inlet opening.

The present invention resolves prior art problems by constructing the mixing element for mobility in relation to the inlet opening of the mixing vessel between a position in which the mixing element is disposed at a distance to the opening to allow unimpeded passage of the polyurethane component into the interior of the mixing vessel, and a position in which the mixing element dives into the inlet opening so that the polyurethane component with injected gas is forced to flow through the mixing element. The adjustability of the movable mixing element enables an optimum operation of the gas charging unit in all operating phases and at varying filling degree of the liquid polyurethane component because the maximum system pressure (e.g. 25 bar), generated by a pump, can be exploited to realize an optimum mixing effect. The viscosity of the filler-laden polyurethane component can hereby be taken fully into account. In other words, changing viscosities as a result of the filling degree and temperature as well as used polyurethane component are considered.

According to another feature of the present invention, the mixing vessel may be cylindrical in shape, with a pipe extending into the mixing vessel and having one end which forms the inlet opening and another inlet opening distal end, with the mixing element being sized to move axially into the pipe. The other inlet opening distal end of the pipe may have attached thereon at least one fixed mixing element which attains a thorough pre-mixing of the filler-laden polyurethane components and injected gas, while encountering minimal pressure loss and exerting minimal shearing action.

According to another feature of the present invention, an ultrasonic sonotrode may be disposed in an area of introduction of gas into the liquid polyurethane component. The provision of such an ultrasonic sonotrode assists distribution and homogenization of injected gas in small and finely distributed gas bubbles.

BRIEF DESCRIPTION OF THE DRAWING

Other features and advantages of the present invention will be more readily apparent upon reading the following description of currently preferred exemplified embodiments of the invention with reference to the accompanying drawing, in which:

FIG. 1a is a schematic illustration of a conventional mixing vessel;

FIG. 1b is another schematic illustration of a conventional mixing vessel;

FIG. 2 is a schematic operating diagram of a gas charging unit according to the present invention;

FIG. 3 is a partly sectional view, on an enlarged scale, of a mixing vessel forming part of the gas charging unit of FIG. 2; and FIG. 4 is a detailed illustration of a mixing element of the mixing vessel of FIG. 3.

DETAILED DESCRIPTION OF PREFERRED EMBODIMENTS

Throughout all the Figures, same or corresponding elements are generally indicated by same reference numerals. These depicted embodiments are to be understood as illustrative of the invention and not as limiting in any way. It should also be understood that the drawings are not necessarily to scale and that the embodiments are sometimes illustrated by graphic symbols, phantom lines, diagrammatic representations and fragmentary views. In certain instances, details which are not necessary for an understanding of the present invention or which render other details difficult to perceive may have been omitted.

Turning now to the drawing, and in particular to FIG. 2, there is shown a schematic operating diagram of a gas charging unit according to the present invention. The gas charging unit includes a storage tank 20 which is filled with a polyurethane component K and accommodates a slowly rotating agitator 21 to prevent settling of fillers contained in the polyurethane component K. The storage tank 20 has a tapered bottom connected to a feed conduit 22 for conducting the filler-laden polyurethane component K through operation of a pump 23 with frequency-controlled motor 44 to a mixer constructed in accordance with the present invention, generally designated by reference numeral 24 and shown in more detail in FIG. 3. The mixer 24 is connected by a return conduit 25 to the storage tank 20. Disposed in the return conduit 25 is a measuring unit 26 for ascertaining the gas fraction in the polyurethane component K in the storage tank 20 as well as determining pressure and temperature of the gas-laden polyurethane component K. The measuring unit 26 yields measuring values which are inputted into a computer 27 via line 45.

Disposed in the feed conduit 22 is a pressure gauge 28 for determining a pressure value commensurate with the pressure of the polyurethane component K as supplied to the mixer 24 and transmitted to the computer 27 via line 46. Gas is supplied to the mixer 24 via a feed conduit 29, with a pressure gauge 47 disposed in the feed conduit 29 to determine a pressure value which is commensurate with the pressure of supplied gas and also transmitted to the computer 27 via line 48. Reference numeral 33 designates an ON/OFF valve for regulating a supply of gas G through the feed conduit 29.

Referring now to FIG. 3, there is shown a detailed illustration of the mixer 24, on an enlarged scale. The mixer 24 includes a generally cylindrical mixing vessel 38 and at least one, here two by way of example, mixing elements 39 which are accommodated in the mixing vessel 38 and moveable back and forth in the direction of the axis of the mixing vessel 38. The mixing elements 39 are operated for back-and-forth movement by an adjustment motor (not shown) disposed outside the mixing vessel 38. The return conduit 25 for outgoing gas-laden polyurethane component K branches off the mixing vessel 38 at an upper location thereof. The mixing vessel 38 has a tapered bottom 50 for receiving a pipe 40 which has an inlet opening 41 of a size to allow the mixing elements 39 to dive in and out. As shown by way of full lines, the mixing elements 39 are disposed at an axial distance to the inlet opening 41 to clear a passage for the polyurethane component K from the pipe 40 into the mixing vessel 38. In their position shown in broken line, the mixing elements 39 have been moved downwards to dive into the pipe 40 so that the polyurethane component K is now forced to flow through the mixing elements 39. Flow resistance can hereby be varied by adjusting the depth by which the mixing elements 39 dive into the pipe 40.

Arranged at the inlet opening distal end of the pipe 40 is at least one, here two by way of example, static mixing elements 42. The axially movable mixing elements 39 as well as the static mixing elements 42 are hereby shown only schematically and may be of identical configuration. FIG. 4 depicts by way of example a perspective view of a commercially available mixing element useful as mixing element 39 or mixing element 42 and having blades which are disposed at different angles to provide guide surfaces and turbulence-inducing surfaces.

Referring again to FIG. 3, it can be seen that the pipe 40 is surrounded by a casing 51 which is formed in one piece with the mixing vessel 38. Of course, the casing 51 may also be configured in such a manner as to form the pipe 40 at the same time. Entering the casing 51 at the lower end of the pipe 40 is the feed conduit 22 for the component K as well as a gas nozzle 43 of the feed conduit 29 for gas. Further disposed in the area of the entry port of the feed conduit 22 into the casing 51 and the gas nozzle 43 is an ultrasonic sonotrode 36.

In response to the inputted data, the computer 27 controls the operation of the gas charging unit as follows: Positional adjustment of the moveable mixing elements 39 is implemented by energizing the transversely operating adjustment motor (not shown) via a control line 30. In addition, the computer 27 controls via control line 32 the ON/OFF valve 33, via control line 34 the motor 44 for the pump 23, and via control line 35 the ultrasonic sonotrode 36. A further control line 52 connects the computer 27 and a measuring unit 37 disposed in the gas feed conduit 29 and provided for determining the gas pressure and the gas flow rate.

During operation of the mixer 24, the polyurethane component K introduced into the lower end of the pipe 40 via the feed conduit 22 is mixed with gas G which is injected by the gas nozzle 43 and distributed in the polyurethane component K in the form of small bubbles. The distribution is hereby further enhanced by the ultrasonic sonotrode 36. The polyurethane component K laden with gas G flows through the static mixing elements 42.

In the starting phase of the polyurethane injection molding assembly, the moveable mixing elements 39 assume the upper disposition, as shown in full lines in FIG. 3 so that a free space is realized between the inlet opening 41 and the mixing elements 39 to allow passage of the gas-laden polyurethane component K+G. As a consequence, the polyurethane injection molding assembly can be operated during the starting phase already at maximum operating pressure (e.g. 25 bar) as generated by the pump 23. As the polyurethane component K heats up, the mixing elements 39 is moved in the direction of the inlet opening 41 and ultimately dives into the pipe 40. This process is controlled by the computer 27 via the control loop shown in FIG. 2 but not described in more detail. Thus, on the basis of an admissible operating pressure generated by the pump 23, the system can react to most different compositions or viscosities of the polyurethane component K. Regardless of the temperature or type of the polyurethane component K (isocyanate or polyol) or the filling degree of the polyurethane component K, the gas charging unit can continuously operate with optimum efficiency, whereby the mixing elements 39 and 42 operate as static mixers and, unlike conventional high-speed agitators shown in FIGS. 1a, 1b, are simple in structure and require little maintenance. As a result, fillers (reinforcement fibers) in the polyurethane injection molding assembly cannot be damaged. The mobility of the mixing elements 39 is hereby very slow and realized in transverse direction.

While the invention has been illustrated and described in connection with currently preferred embodiments shown and described in detail, it is not intended to be limited to the details shown since various modifications and structural changes may be made without departing in any way from the spirit of the present invention. The embodiments were chosen and described in order to best explain the principles of the invention and practical application to thereby enable a person skilled in the art to best utilize the invention and various embodiments with various modifications as are suited to the particular use contemplated.

What is claimed as new and desired to be protected by Letters Patent is set forth in the appended claims and includes equivalents of the elements recited therein:

What is claimed is:

1. Apparatus for adding gas to a liquid polyurethane component, comprising:
    a mixing vessel having an inlet opening and an outlet in spaced-apart relationship, said mixing vessel receiving a liquid polyurethane component via the inlet opening;
    a nozzle for introduction of gas into the mixing vessel via the inlet opening; and
    at least one mixing element arranged in the mixing vessel for mobility in relation to the inlet opening of the mixing vessel between a position in which the mixing element is disposed at a distance to the inlet opening, and a position in which the mixing element dives into the inlet opening to force a flow of the liquid polyurethane component and gas through the mixing element.

2. The apparatus of claim 1, wherein the mixing vessel is cylindrical in shape, and further comprising a pipe extending into the mixing vessel and having one end which forms the inlet opening and another inlet opening distal end, said mixing elements being sized to move into the pipe, with the liquid polyurethane component being introduced via the inlet opening distal end of the pipe, and with gas injected into the inlet opening-distal end of the pipe via the nozzle, and further comprising at least one fixed mixing element for directing the liquid polyurethane component after injection of the gas.

3. The apparatus of claim 1, further comprising an ultrasonic sonotrode disposed in an area of introduction of gas into the liquid polyurethane component.

4. The apparatus of claim 1, wherein the liquid polyurethane component is a filler-laden polyurethane component of a polyurethane injection molding unit.

5. Apparatus for adding gas to a liquid polyurethane component, comprising:
    a mixing vessel having an inlet opening and receiving a liquid polyurethane component via the inlet opening;
    at least one movable mixing element arranged in the mixing vessel in alignment with the inlet opening and axially displaceable in relation to the inlet opening;
    a nozzle for introduction of gas into the mixing vessel via the inlet opening;
    a pipe extending into the mixing vessel and having one end which forms the inlet opening and another inlet opening distal end, said mixing elements being sized to move into the pipe, with the liquid polyurethane component being introduced via the inlet opening distal end of the pipe, and with gas injected into the inlet opening-distal end of the pipe via the nozzle; and
    at least one fixed mixing element for directing the liquid polyurethane component after injection of the gas.

6. The apparatus of claim 5, wherein the mixing vessel is cylindrical in shape.

7. The apparatus of claim 5, wherein the liquid polyurethane component is a filler-laden polyurethane component of a polyurethane injection molding unit.

8. Apparatus for adding gas to a liquid polyurethane component, comprising:
    a mixing vessel having an inlet opening and receiving a liquid polyurethane component via the inlet opening;
    at least one movable mixing element arranged in the mixing vessel in alignment with the inlet opening and axially displaceable in relation to the inlet opening;
    a nozzle for introduction of gas into the mixing vessel via the inlet opening; and
    an ultrasonic sonotrode disposed in an area of introduction of gas into the liquid polyurethane component.

9. The apparatus of claim 8, wherein the liquid polyurethane component is a filler-laden polyurethane component of a polyurethane injection molding unit.

10. Apparatus for adding gas to a liquid polyurethane component, comprising:
    a mixing vessel defining a mixing chamber which has an inlet opening and an outlet in spaced-apart relationship, said mixing chamber receiving a liquid polyurethane component via the inlet opening;
    at least one mixing element arranged in the mixing chamber for movement in and out of the inlet opening; and
    a nozzle at a distance to the mixing chamber for injecting gas into the liquid polyurethane component to produce a gas-laden polyurethane component before entering the mixing chamber through the inlet opening.

* * * * *